United States Patent [19]
Reichel et al.

[11] 4,454,254
[45] Jun. 12, 1984

[54] AMINOPLAST RESINS, DISPERSIONS, AND LOW FLAMMABILITY CELLULAR AND NON-CELLULAR POLYURETHANE PRODUCTS PREPARED THEREFROM

[75] Inventors: Curtis J. Reichel; John T. Patton, Jr., both of Wyandotte; Thirumurti Narayan, Grosse Ile, all of Mich.

[73] Assignee: BASF Wyandotte Corporation, Wyandotte, Mich.

[21] Appl. No.: 445,794

[22] Filed: Dec. 1, 1982

[51] Int. Cl.³ .................... C08G 18/14; C08G 18/08; C08G 18/64
[52] U.S. Cl. .................... 521/136; 521/102; 521/103; 521/109.1; 521/113; 521/114; 521/117; 521/121; 528/232; 528/240; 528/243
[58] Field of Search ................. 528/232, 240, 243; 521/136

[56] References Cited

U.S. PATENT DOCUMENTS

| | | | |
|---|---|---|---|
| 2,485,079 | 10/1949 | Wohnsiedler et al. | 528/232 |
| 2,485,080 | 10/1949 | Wohnsiedler et al. | 528/232 |
| 3,428,607 | 2/1969 | Renner | 528/232 |
| 4,122,049 | 10/1978 | Wagner | 521/136 |
| 4,260,530 | 4/1981 | Reischl et al. | 521/136 |

Primary Examiner—H. S. Cockeram
Attorney, Agent, or Firm—Norbert M. Lisicki

[57] ABSTRACT

Aminoplast resin is prepared by reacting urea or melamine with formaldehyde in the presence of a stabilizer compound. Dispersions of the resin in a polyol reacted with a polyisocyanate produce polyurethane products having low flammability properties.

6 Claims, No Drawings

AMINOPLAST RESINS, DISPERSIONS, AND LOW FLAMMABILITY CELLULAR AND NON-CELLULAR POLYURETHANE PRODUCTS PREPARED THEREFROM

BACKGROUND OF THE INVENTION

1. Field of the Invention

The present invention relates to aminoplast resins, to a process for the preparation thereof, and to cellular and non-cellular polyurethane products prepared from said aminoplast compositions. More particularly, the invention relates to aminoplast resins, a process for their preparation, stable dispersions of said resins in polyols, and to low flammability cellular and non-cellular polyurethane products prepared employing said dispersions.

2. Description of the Prior Art

The prior art teaches the preparation of melamine formaldehyde condensation products in the presence of protective colloids such as sodium carboxymethylcellulose as reported in an article by Von Alfred Renner in "Die Makromolekulare Chemie," 120, pp68–66 (1968). U.S. Pat. No. 4,122,049 teaches the preparation of urea formaldehyde products and their use in the preparation of polyurethane foams. U.S. Pat. No. 4,096,101 teaches the preparation of melamine formaldehyde products which are employed in elastomeric polyurethanes for after cross-linking only after the chain lengthening reaction has occurred. U.S. Pat. No. 3,218,279 teaches the preparation of urea borates by the condensation of urea, formaldehyde, boric acid and ethylene glycol. These resins are employed with alkyd resins as binders. The prior art does not teach the use of these aminoplast resins for the preparation of low flammability polyurethane cellular and non-cellular products.

SUMMARY OF THE INVENTION

The present invention relates to dispersible aminoplast resin, a process for its preparation, stable dispersions of the resin in polyols and the low flammability cellular and non-cellular polyurethane products prepared from these resin dispersions.

DESCRIPTION OF THE PREFERRED EMBODIMENT

In accordance with the invention, aminoplast resins are prepared by reacting urea or melamine with formaldehyde in the presence of a stabilizer component employing a buffer solution. This control of pH results in a smaller particle size which, in turn, results in a stable dispersion of the resin in a polyol. These aminoplast resins are isolated from the solution and dispersed in polyols. The dispersions of the aminoplast resins in polyols are then employed for the preparation of cellular and non-cellular low flammability polyurethane products. The aminoplast resins and dispersions thereof are prepared in the following manner:

The urea and formaldehyde are reacted in an aqueous solution in the presence of a stabilizer compound in conjunction with a buffer at a pH of 6.5 by acidification with hydrochloric acid. After the aminoplast resin has formed, it has filtered from solution, washed with water and dried at room temperature from about 60° C. to about 90° C. This product is then dispersed in a polyol.

Alternatively, urea, furfuryl aldehdye and formaldehyde in an aqueous solution are reacted at a pH of about 8 at 95° C. for three hours. The solution is cooled and the pH adjusted to about 2 with a 10 percent aqueous solution of HCl. The resulting resin is filtered from solution, washed with water and dried at temperatures from about 60° C. to 95° C. This product is then dispersed in a polyol.

In still another embodiment, an aqueous solution of formaldehyde and a stabilizer compound are heated to about 95° C., the pH of the solution is adjusted to about 6.5 with a 10 percent solution of HCl. Melamine is then added and the pH readjusted to a pH of 6.5 as previously done. The reaction mixture is heated at 95° C. and the resulting resin is filtered off, washed with water and dried at about 95° C.

It is preferred to employ a buffer solution of sodium hydroxide and potassium phosphate to maintain a pH of about 6.5 prior to the first adjustment of the pH. The resulting product is then dispersed in a polyol.

The ratio of formaldehyde to urea may vary from 1:1 to 2:1. The ratio of formaldehyde to melamine may vary from 3:1 to 6:1. The optimum pH for producing small dispersible particles is at 6.5.

The use of a stabilizer compound also contributes to the production of small readily dispersible particles of aminoplast resin. The concentration of the stabilizer compound may vary from 1 to 25 percent of the total resin. Stabilizer compounds which may be employed are selected from the group consisting of tracaganth gum, gelatin, agar agar, starch, methyl cellulose, polyvinyl alcohol, hydroxyethyl starch, polyethyleneimine, sodium carboxymethylcellulose, polyoxyethylene oxide polymers, copolymer and terpolymers of acrylamide, acrylonitrile and other ethylenically unsaturated monomers such as styrene, maleic anhydride, acrylic acid and acrylates, and surface active agents such as fatty alcohol sulfates, alkylaryl sulfonates, monoglyceride sulfates, nonionic polyoxyalkylene polyether polyols, boric acid, ethylene glycol, and furfuryl aldehyde.

The temperatures for the preparation of the resins may vary from about 25° C. to about 100° C. Any acid catalyst which will reduce the pH of the system to 6.5 can be used. These include hydrochloric acid, sulfuric acid, nitric acid, phosphoric acid, acetic acid and benzoyl chloride.

The dispersions of the subject resins may be prepared by adding the finely divided free-flowing resin into the polyol which is being stirred at a very rapid rate. During the mixing operation, the temperature of the dispersion is now allowed to increase above 100° C. The concentration of resin dispersed in the polyol may range from 1 to 80 percent by weight, preferably from 5 to 50 percent by weight. The dispersions may also be carried out employing mechanical dispersing equipment such as ball mills, bead mills and the like. Preferably, ball shaped grinding elements made of glass, ceramic material, metal or hard abrasion resistant plastics such as polyamides may be employed.

In accordance with the present invention, rigid, flexible and microcellular low flammability foams may be prepared by the catalytic reaction of organic polyisocyanates with polyols containing therein the dispersed aminoplast resin in the presence of blowing agents, surfactants and other additives which may be desired. Non-cellular products may also be prepared in the absence of blowing agents.

Typical polyols which may be employed in the preparation of the dispersions of the instant invention include polyhydroxyl-containing polyesters, polyoxyalkylene polyether polyols, polyhydroxy-terminated polyurethane polymers, polyhydroxyl-containing phosphorus compounds, and alkylene oxide adducts of polyhydric sulfur-containing esters, polyacetals, aliphatic polyols or diols, ammonia, and amines including aromatic, aliphatic and heterocyclic amines as well as mixtures thereof. Alkylene oxide adducts of compounds which contain two or more different groups within the above-defined classes may also be used such as amino alcohols which contain an amino group and a hydroxyl group. Also, alkylene oxide adducts of compounds which contain one —SH group and one —OH group as well as those which contain an amino group and a —SH group may be used. Generally, the equivalent weight of the polyols will vary from 100 to 10,000, preferably from 1000 to 3000 and contain from 2 to 8 active hydrogen atoms.

Any suitable hydroxy-terminated polyester polyol may be used such as are obtained, for example, from the reaction of polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-butyl-α-ethylglutaric acid, α,β-diethylsuccinic acid, isophthalic acid, terephthalic acid, hemimellitic acid, and 1,4-cyclohexanedicarboxylic acid. Any suitable polyhydric alcohol may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

Any suitable polyoxyalkylene polyether polyol may be used such as the polymerization product of an alkylene oxide with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-oxytetramethylene and polyoxyethylene glycols, and copolymer glycols prepared from blends as well as sequential addition of two or more alkylene oxides. The polyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2-bis(4-hydroxyphenyl)propane and blends thereof having equivalent weights of from 100 to 5000.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing at least two —SH groups such as 1,2-ethanedithiol, 1,2-propanedithiol, 1,2-propanedithiol, and 1,6-hexanedithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-aminoaniline, 1,5-diaminonaphthalene, methylene dianiline, the condensation products of aniline and formaldehyde, and diaminotoluene; aliphatic amines such as methylamine, triisopropanolamine, ethylenediamine, 1,3-diaminopropane, 1,3-diaminobutane, and 1,4-diaminobutane.

The organic polyisocyanate employed in the instant invention corresponds to the formula $R'(NCO)_z$ where $R'$ is a polyvalent organic radical which is either aliphatic, arylalkyl, alkylaryl, aromatic or mixtures thereof and $z$ is an integer which corresponds to the valence of $R'$ and is at least 2. Representative of the types of organic polyisocyanates contemplated herein include, for example, 1,2-diisocyanatoethane, 1,3-diisocyanatopropane, 1,2-diisocyanatopropane, 1,4-diisocyanatobutane, 1,5-diisocyanatopentane, 1,6-diisocyanatohexane, bis(3-isocyanatopropyl)ether, bis(3-isocyanatopropyl)sulfide, 1,7-diisocyanatoheptane, 1,5-diisocyanato-2,2-dimethylpentane, 1,6-diisocyanate-3-methoxyhexane, 1,8-diisocyantooctane, 1,5-diisocyanato-2,2,4-trimethylpentane, 1,9-diisocyanatononane, 1,10-diisocyanatopropyl ether of 1,4-butylene glycol, 1,11-diisocyanatoundecane, 1,12-diisocyanatododecane, bis(isocyanatohexyl) sulfide, 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitrobenzene, 2,5-diisocyanato-1-nitrobenzene, m-phenylene diisocyanate, 2,4-toluene diisocyanate, 2,6-toluene diisocyanate, mixtures of 2,4- and 2,6-toluene diisocyanate, 1,6-hexamethylene diisocyanate, 1,4-tetramethylene diisocyanate, 1,4-cyclohexane diisocyanate, hexahydrotoluene diisocyanate, 1,5-naphthylene diisocyanate, 1-methoxy-2,4-phenylene diisocyanate, 4,4'-diphenylmethane diisocyanate, 4,4'-biphenylene diisocyanate, 3,3'-dimethoxy-4,4'-biphenyl diisocyanate, 3,3'-dimethyl-4,4'-diphenylmethane diisocyanate and 3,3'-dimethyldiphenylmethane-4,4'-diisocyanate; the triisocyanates such as 4,4',4'''-triphenylmethane triisocyanate, polymethylene polyphenylene polyisocyanate and 2,4,6-toluene triisocyanate; and the tetraisocyanates such as 4,4'-dimethyl-2,2'-5,5'-diphenylmethane tetraisocyanate. Especially useful due to their availability and properties are toluene diisocyanate, 2,4'-diphenylmethane diisocyanate, 4,4'-diphenylmethane diisocyanate, polymethylene polyphenylene polyisocyanate, and mixtures thereof.

The polyurethane foams of the present invention may also be prepared by reacting organic polyisocyanates with a graft polymer polyol containing therein the dispersed resin of the invention in the presence of a blowing agent and optionally in the presence of additional polyhydroxyl-containing components, chain-extending agents, catalysts, surface-active agents, stabilizers, dyes, fillers and pigments. Suitable processes for the preparation of cellular polyurethane plastics are disclosed in U.S. Pat. No. Re. 24,514 together with suitable machinery to be used in conjunction therewith. For the preparation of microcellular foams, blowing agents are generally not necessary. If desired for more expanded foams, they may be employed. When water is used, corresponding quantities of excess isocyanate to react with the water and produce carbon dioxide are necessary.

It is possible to proceed with the preparation of the polyurethane plastics by a prepolymer technique wherein an excess of organic polyisocyanate is reacted in a first step with the polyol containing the aminoplast resin dispersion to prepare a prepolymer having free isocyanate groups which is then reacted in a second step with water to prepare a foam. Alternately, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used as blowing agents.

Chain-extending agents which may be employed in the preparation of the polyurethane foams include those compounds havng at least two functional groups bearing active hydrogen atoms such as water, hydrazine, primary and secondary diamines, amino alcohols, amino acids, hydroxy acids, glycols, or mixtures thereof. A preferred group of chain-extending agents includes water, ethylene glycol, 1,4-butanediol, and primary and secondary diamines which react more readily with the polyisocyanates than does water. These include phenylenediamine, ethylenediamine, diethylenetriamine, N-(2-hydroxypropyl)-ethylenediamine, N,N'-di(2-hydroxypropyl)ethylenediamine, piperazine, and 2-methylpiperazine.

Any suitable catalyst for the polyurethane formation may be used including tertiary amines such as, for example, triethylenediamine, N-methylmorpholine, N-ethylmorpholine, diethylaminoethanol, N-laurylmorpholine, 1-methyl-4(dimethylaminoethyl)piperazine, 3-methoxy-N,N'-dimethylpropylamine, N,N,N'-trimethylisopropylpropylenediamine, N,N,N',N'-tetraethylpropylenediamine, dimethylbenzylamine, and the like. Other suitable catalysts are, for example, tin compounds such as stannous chloride, tin salts of carboxylic acids, such as dibutyltin dilaurate and stannous octoate, as well as other organo metallic compounds such as are disclosed in U.S. Pat. No. 2,846,408.

If desired, a surface-active agent may be employed. Numerous surface-active agents have been found satisfactory. Nonionic surface-active agents are preferred. Of these, the nonionic surfact-active agents prepared by the sequential addition of propylene oxide and then ethylene oxide to propylene glycol and the solid or liquid organosilicones have been found particularly desirable. Other surface-active agents which are operative, although not preferred, include polyethylene glycol ethers of long chain alcohols, tertiary amine or alkylolamine salts of long chain alkyl acid sulfate esters, alkylsulfonic esters, and alkylarylsulfonic acids.

In the following examples, all parts are by weight unless otherwise designated and the following abbreviations are employed.

Crude MDI—Polymethylene polyphenylene polyisocyanate.

TDI—80/20; 2,4-, 2,6-toluene diisocyanate.

DABCO WT—Delayed action triethylene diamine catalyst.

L 5303—Silicone surfactant.

T-12—Dibutyltin dilaurate.

Polyol A—allyl glycidyl ether-modified, ethylene oxide capped, glycerine, propylene glycol, propylene oxide polyol containing 15 percent ethylene oxide having a hydroxyl number of 33.

Polyol B—Polyol C containing 21 percent of a 1:1 acrylonitrile:styrene copolymer having a hydroxyl number of 27.5.

Polyol C—allyl glycidyl ether-modified, ethylene oxide capped, glycerine, propylene glycol, propylene oxide polyol containing 14 percent ethylene oxide having a hydroxyl number of 35.

Polyol D—glycerine, propylene oxide, ethylene oxide adduct containing 16.5 percent ethylene oxide having a hydroxyl number of 35.

Polyol E—Polyol A containing 20 percent of a 2:3 acrylonitrile:styrene copolymer having a hydroxyl number of 26.5.

Component A—ethylene glycol

Component B—boric acid

Component C—furfuryl aldehyde

Component D—sodium carboxymethylcellulose

In the examples, the flame retardance of the foam samples was determined by employing the California Bulletin No. 117 flame test. The specifications to pass this test are: after-flame, maximum 10 seconds, average $\leq 5$ seconds; char length, maximum 8 inches, average $\leq 6$ inches.

EXAMPLES 1–4

Employing the amounts indicated in Table I, urea was dissolved in from 225 to 600 mls of water in a 3-neck flask equipped with a stirrer, thermometer and a reflux condenser. Components A or B were added while the mixture was stirred. A 10 percent aqueous solution of HCl was then added to the mixture. In Example 1, 6–8 grams of aqueous HCl solution were added while in Examples 2 and 3, 13.6 grams were added. In Example 4, instead of the HCl, only boric acid was employed. The temperatures employed are as indicated in Table I. The resins formed were filtered, washed with water and dried at temperatures from 60° C. to 95° C. The resins were then pulverized in a Waring blender for about 10 minutes and then dispersed into various polyols with vigorous stirring.

EXAMPLE 5

Employing the amounts indicated in Table I, urea was dissolved in 1000 mls of water together with the furfuryl aldehyde and formaldehyde in a three-neck flask equipped with a stirrer, thermometer and reflux condenser and the pH was adjusted to 8 with sodium carbonate. The mixture was heated at 95° C. for three hours and cooled to 25° C. The solution was then acidified to pH 2 with a 10 percent aqueous solution of HCl and the reaction was then heated to 60° C. for 5 hours. The resulting resin was filtered off, washed with water and dispersed in Polyol B.

EXAMPLES 6-10

Employing the amounts indicated in Table I, 2500 mls water, formaldehyde, and Component E were added to a three-neck flask equipped with a stirrer, thermometer, and reflux condenser. The mixture was heated to 90° C. to 95° C. and the pH of the solution was adjusted to about 6.5 with a 10 percent aqueous HCl solution. Melamine was then added and the pH was readjusted to a pH of 6.5 with a 10 percent solution of HCl. The reaction mixture was heated at 90° C. The resulting resin was filtered, washed with water and dispersed into various polyols with vigorous stirring. In Examples 8 to 11, a buffer solution of 0.1 M sodium hydroxide and 0.1 M potassium phosphate was added prior to adjustment of the pH to 6.5 with $KH_2PO_4$ instead of HCl.

Turrax homo mixer. The physical properties of the dispersions are further listed in Table II.

TABLE II

| Example | Resin of Example, g | Polyol, g | Viscosity cps, 25° C. | Particle Size μ |
|---|---|---|---|---|
| 11 | 1,100 | A, 400 | 1900 | 20-85 |
| 12 | 2,100 | A, 400 | 1830 | — |
| 13 | 3,200 | C, 800 | 1620 | 1-4 |
| 14 | 6,66 | C, 334 | 1520 | — |
| 15 | 5,100 | C, 400 | 1500 | — |
| 16 | 4,200 | C, 800 | 1750 | — |
| 17 | 7,200 | C, 800 | 3600 | — |
| 18 | 8,200 | C, 800 | 2900 | 5-15 |
| 19 | 9,200 | C, 800 | 3400 | 5-15 |
| 20 | 11,200 | D, 800 | 3200 | — |

EXAMPLES 22-34

Polyurethane foams were prepared employing the following formulation.

| | |
|---|---|
| Polyol dispersions | 300 gm |
| Water | 9 ml |
| DABCO WT | 2.1 ml |
| T-12 | 0.1 ml |
| L-5303 | 4.0 ml |
| TDI/crude MDI (80/20) | 105 index |

The resin polyol dispersion, water, surfactant and DABCO WT catalyst were mixed together for 30 seconds. Dibutyltin dilaurate (T-12) was added and mixed for 15 seconds. The TDI/crude MDI mixture was added with stirring, mixed for 5 seconds, and poured into a one-gallon cake box. After the foam had risen, the foam was cured in an oven for 10 minutes at 110° C. The foam properties are shown in Tables III and IV. The concentrations of resin were 25 percent based on the weight of resin and polyol. The foams of the invention

TABLE I

| Example | Urea, g | Component, g | Formaldehyde, g | Temperature, °C. | Catalyst | Buffer | pH |
|---|---|---|---|---|---|---|---|
| 1 | 120 | A, 19.5 B, 4.88 | 202 | 53 | HCl | — | — |
| 2 | 240 | A, 3.9 B, 9.76 | 404 | 53 | HCl | — | — |
| 3 | 240 | A, 200 B, 62 | 324 | 51 | HCl | — | — |
| 4 | 240 | A, 124 B, 41.3 | 404 | 98 | Boric | — | — |
| 5 | 60 Melamine, g | D, 96 | 81 | 65 | HCl | — | 2 |
| 6 | 189 | E, 8.5 | 180 | 90 | HCl | — | 6.5 |
| 7 | 189 | E, 8.5 | 486 | 92 | $KH_2PO_4$ | yes | 6.5 |
| 8 | 189 | E, 8.5 | 486 | 93 | $KH_2PO_4$ | yes | 6.5 |
| 9 | 189 | E, 8.5 | 486 | 86 | $KH_2PO_4$ | yes | 6.5 |
| 10 | 189 | E, 13 | 486 | 92 | HCl | yes | 6.5 |

EXAMPLES 11-21

As indicated in Table II, the resin polymers of the various of the various Examples in the concentrations indicated and dispersed in the various polyols as indicated were dispersed, employing a high-speed Ultradisplayed superior flame retardant properties as measured by the California 117 flame test compared to the foams of Examples 22, 23, 25 and 30. Example 22 was prepared using Polyol A, Example 23 was prepared using Polyol E, Example 25 was prepared using Polyol B, Example 30 was prepared using Polyol C containing 20 percent Thermolin 101 ®.

TABLE III

| Example | 22 | 23 | 24 | 25 | 26 | 27 | 28 | 29 |
|---|---|---|---|---|---|---|---|---|
| Resin of Example | — | — | 1 | — | 3 | 6 | 5 | 4 |
| Properties | | | | | | | | |
| Density, pcf | 1.83 | 1.83 | 1.77 | 1.74 | 1.85 | 1.76 | 1.99 | 2.02 |
| Tensile Strength, psi | 10.4 | 16.7 | 9.8 | 21.0 | 5.7 | 7.5 | 10.6 | 9.3 |
| Elongation, % | 153 | 167 | 123 | 167 | 73 | 100 | 157 | 127 |

TABLE III-continued

| Example | 22 | 23 | 24 | 25 | 26 | 27 | 28 | 29 |
|---|---|---|---|---|---|---|---|---|
| Resin of Example | — | — | 1 | — | 3 | 6 | 5 | 4 |
| Tear Strength, pi | 1.0 | 1.9 | 1.2 | 1.8 | 0.6 | 1.3 | 1.5 | 1.0 |
| ILD, lb/1 sq. in. | | | | | | | | |
| load at 25% defl. | 0.5 | 0.5 | 0.2 | 0.8 | 0.3 | 0.4 | 0.2 | 0.2 |
| load at 50% defl. | 0.9 | 1.0 | — | — | — | — | 0.6 | 0.6 |
| load at 65% defl. | 1.2 | 1.4 | 0.7 | 1.8 | 1.2 | 1.1 | 0.9 | 1.1 |
| load at 25% return | 0.4 | 0.4 | 0.4 | 0.2 | 0.6 | 0.2 | 0.3 | 0.1 | 0.2 |
| Sag Factor | 2.37 | 2.75 | 3.19 | 2.42 | 3.71 | 2.94 | 3.62 | 4.74 |
| Guide Factor | 0.3 | 0.3 | 0.1 | 0.4 | 0.2 | 0.2 | 0.1 | 0.1 |
| Recovery, % | 81.6 | 68.6 | 71.4 | 76.3 | 74.2 | 77.8 | 54.2 | 73.9 |
| CLD, psi | | | | | | | | |
| load at 50% defl. | 0.21 | 0.32 | 0.14 | 0.42 | 0.30 | 0.26 | 0.24 | 0.30 |
| Compression Set, % | | | | | | | | |
| 50% compression | 15.3 | 21.4 | 50.1 | 19.8 | 71.9 | 28.1 | 49.4 | 50.6 |
| Airflow, cfm at 5" H$_2$O | 1.24 | 0.70 | 1.68 | 0.50 | — | — | 1.14 | 0.41 |
| CFT* | | | | | | | | |
| Avg. Char Length, in. | 12.0 | 10.6 | 1.1 | 12.0 | 2.8 | 2.6 | 1.9 | 2.1 |
| Max. Char Length, in. | 12.0 | 12.0 | 2.4 | 12.0 | 3.4 | 3.0 | 2.7 | 2.7 |
| Avg. Afterflame, sec. | — | 28.7 | 0 | 15.9 | 0 | 0 | 0 | 0 |
| Max. Afterflame, sec. | — | 45.5 | 0 | 19.8 | 0 | 0 | 0 | 0 |

*CFT is the California Bulletin No. 117 flame test.

In Table III, Examples 25, 26, 27, 28 and 29 pass the California No. 117 flame test when compared to Examples 22, 23 and 25 which do not contain the resins of the invention.

TABLE IV

| Example | 30 | 31 | 32 | 33 | 34 |
|---|---|---|---|---|---|
| Resin of Example | — | 7 | 8 | 9 | 11 |
| Properties | | | | | |
| Density, pcf | 1.84 | 1.87 | 1.96 | 1.90 | 1.73 |
| Tensile Strength, psi | 10.1 | 10.1 | 12.1 | 14.3 | 9.6 |
| Elongation, % | 187 | 147 | 123 | 130 | 87 |
| Tear Strength, pi | 1.2 | 1.3 | 0.9 | 1.0 | 0.8 |
| ILD, lb/1 sq. in. | | | | | |
| load at 25% defl. | 0.2 | 0.4 | 0.4 | 0.4 | 0.4 |
| load at 50% defl. | 0.5 | — | 0.8 | 0.8 | 0.8 |
| load at 65% defl. | 0.7 | 1.0 | 1.2 | 1.2 | 1.1 |
| load at 25% return | 0.1 | 0.3 | 0.3 | 0.3 | 0.3 |
| Sag Factor | 3.50 | 2.84 | 2.95 | 2.86 | 2.61 |
| Guide Factor | 0.1 | 0.2 | 0.2 | 0.2 | 0.2 |
| Recovery, % | 65.0 | 78.4 | 77.5 | 73.8 | 78.0 |
| CLD, psi | | | | | |
| load at 50% defl. | 0.18 | 0.28 | 0.29 | 0.30 | 0.27 |
| Compression Set, % | | | | | |
| 50% compression | 59.0 | 61.0 | 26.5 | 38.5 | 23.7 |
| Airflow, cfm at 5" H$_2$O | 0.75 | — | 2.04 | 1.80 | 1.10 |
| CFT | | | | | |
| Avg. Char Length, in. | 1.9 | 2.8 | 2.5 | 2.9 | 2.6 |
| Max. Char Length, in. | 2.8 | 3.7 | 2.8 | 3.2 | 3.2 |
| Avg. Afterflame, sec. | 1.6 | 0 | 0 | 1.3 | 0 |
| Max. Afterflame, sec. | 1.6 | 0 | 0 | 3.4 | 0 |

In Table IV, Examples 31 to 34 pass the California No. 117 flame test employing the dispersions of the invention equivalent to Example 30 which employed Polyol C containing Thermolin 101 ®, a flame retardant product.

The embodiments of the invention in which an exclusive privilege or property is claimed are defined as follows:

1. A 1 to 80 percent by weight dispersion in a polyol of an aminoplast resin said resin prepared by reacting (a) urea or melamine, (b) formaldehyde, in the presence of a stabilizer compound and in the presence of an acid catalyst wherein the pH is maintained at 6.5 by means of a buffer solution, in aqueous solution at a temperature range from about 25° C. to about 100° C., (c) removing the solid resin from solution and (d) dispersing the resin in the polyol.

2. The dispersion of claim 1 wherein the acid catalyst is hydrochloric acid.

3. The dispersion of claim 1 wherein the stabilizer compounds are selected from the group consisting of tracaganth gum, gelatin, agar agar, starch methyl cellulose, sodium carboxymethylcellulose, polyvinyl alcohol, hydroxyethyl starch, polyethyleneimine, polyoxyethylene oxide polymer, copolymer and terpolymers of acrylamide, acrylonitrile, styrene, maleic anhydride, acrylic acid and the acrylates, fatty alcohol sulfates, alkylaryl sulfonates, monoglyceride sulfates, nonionic polyoxyalkylene polyether polyols, ethylene glycol, boric acid, and furfuryl aldehyde.

4. The product of claim 1.

5. A cellular polyurethane product prepared by the reaction of an organic polyisocyanate with the polyol dispersion of claim 1 in the presence of a blowing agent.

6. A non-cellular polyurethane product prepared by the reaction of an organic polyisocyanate with the polyol dispersion of claim 1.

* * * * *